United States Patent [19]

Bharucha et al.

[11] 4,153,613

[45] May 8, 1979

[54] ACETALS AND KETALS OF ASCORBIC ACID AND ANTI-NITROSAMINE COMPOSITIONS AND METHODS USING SAME

[75] Inventors: Kekhusroo R. Bharucha, Toronto; Charles K. Cross, Rexdale; Leon J. Rubin, Toronto, all of Canada

[73] Assignee: Canada Packers Limited, Toronto, Canada

[21] Appl. No.: 871,510

[22] Filed: Jan. 23, 1978

Related U.S. Application Data

[62] Division of Ser. No. 799,093, May 20, 1977.

[51] Int. Cl.² ........................................... C07D 317/10
[52] U.S. Cl. .............................. 260/340.9 R; 426/332

[58] Field of Search ................................. 260/340.9 R

[56] References Cited

U.S. PATENT DOCUMENTS

| | | | |
|---|---|---|---|
| 2,190,167 | 2/1940 | Zima | 260/340.9 R X |
| 2,265,121 | 12/1941 | Reichstein | 260/344 |

*Primary Examiner*—Ethel G. Love
*Attorney, Agent, or Firm*—Bacon & Thomas

[57] ABSTRACT

Novel acetal and ketal derivatives of ascorbic acid having utility in controlling the formation of undesirable nitrosamines in cooked, nitrite cured meat products are disclosed. Meat treating compositions containing these compounds, methods of treating meats with same and meat products containing same are also disclosed.

16 Claims, No Drawings

ACETALS AND KETALS OF ASCORBIC ACID AND ANTI-NITROSAMINE COMPOSITIONS AND METHODS USING SAME

This is a division, of application Ser. No. 799,093, filed May 20, 1977.

BACKGROUND OF THE INVENTION

This invention relates to new ascorbic acid derivatives and to the control of nitrosamine formation in cooked, nitrite cured meats through use of these derivatives.

Cured meat products have been prepared for many years by treatment of fresh meat with an alkali metal nitrite-containing composition or with a composition containing a mixture of alkali metal nitrite and an alkali metal nitrate. The curing mixture generally contains other material including sodium chloride and sugar. Addition of spices to the mixture is optional. Ascorbic acid including isoascorbic acid (sometimes called erythorbic acid) or salts of ascorbic acid or isoascorbic acid are sometimes included to accelerate the formation of cured meat pigments.

The conventional alkali metal nitrite or nitrate-nitrite containing curing mixtures provide quite satisfactory cures insofar as cured-meat preservation, flavor, and development of the pink to red color characteristic of cured meats are concerned. Although nitrates have been used alone in curing mixtures, such mixtures must depend on bacterial action to convert the nitrates to nitrites during the curing process since, as yet, there is no practical substitute for the nitrite ion for curing meats.

Unfortunately, minute amounts of undesirable nitrosamines may occur in meats, particularly bacon, which have been cured with the conventional curing mixtures, and which have been cooked by methods in which the fats reach relatively high temperatures. For example, N-nitrosopyrrolidine and dimethylnitrosamine are found on frying bacon, the cook-out fat containing the largest proportion of these volatile nitrosamines with N-nitrosopyrrolidine being present in the greater amount. These nitrosamines are not found in the cured raw meats. Apparently, the temperature attained by the fats in frying or equivalent cooking processes, such as broiling, grilling, microwave heating, etc., facilitates the reaction of alkali metal nitrites and amines of the meat to form nitrosamines. Since N-nitrosopyrrolidine and dimethylnitrosamine have been found to be carcinogenic in tests on experimental animals, they are regarded as a potential hazard in human food products. It is desirable, therefore, to reduce, eliminate or prevent the formation of these substances in cooked meat products.

Ascorbic acid, erythorbic acid and certain salts and esters thereof have heretofore been investigated for their effect in inhibiting the formation of nitrosamines during the frying of bacon. For example, the results of an investigation upon the inhibitory effect of sodium ascorbate on N-nitrosodimethylamine in nitrite cured pork are reported in J. Sci. Food Argic., 1975, 26 (1), pp 47–53. A comparison of the effect of propyl gallate, piperazine, sodium ascorbate and ascorbyl palmitate on nitrosopyrrolidine formation in bacon is reported in J. Agric. Food Chem., 1976, 24 (2), pp 397–401. Other investigations have studied the effects of various esters of ascorbic acid on nitrosamine formation in pork. See, for example, J. Food Science 1976, 41 (1) pp 199–200. While many of the aforementioned compounds are effective in reducing to some extent the amount of nitrosamines formed in cooked, cured meat, all have their shortcomings. For example, sodium isoascorbate is not fully effective. Ascorbyl palmitate is more effective than sodium isoascorbate but we have found an inconsistent tendency for the activity of this compound to decrease with storage time. The sodium salt of ascorbyl palmitate is not useful. An ascorbic acid derivative which provides effective anti-nitrosamine activity over the storage life of the meat product in which it is incorporated is much to be desired.

SUMMARY OF THE INVENTION

The present invention provides novel acetal and ketal derivatives of ascorbic acid and edible salts thereof that effectively reduce or eliminate the nitrosamines which are generated when nitrite cured meat is cooked at the usual high temperatures attained during frying, grilling or broiling. It has been discovered that when a small amount of one of the novel compounds is included in the curing mixtures or is otherwise applied to the meat before cooking, the proportion of undesirable nitrosamines contained in the meat after cooking is substantially eliminated. Moreover, once incorporated into the cured meat, the compounds of the invention exhibit good resistance to deterioration over time so that their ability to reduce nitrosamine formation is not exhausted by storage of treated meat prior to cooking. Additionally, the compounds of the invention, like ascorbic acid and its known derivatives, exhibit useful anti-oxidant properties.

It is therefore a primary object of the invention to provide novel compounds which, when incorporated in meat cured or to be cured with nitrites, reduce or eliminate the formation of undesirable nitrosamines during cooking of the cured meat.

Another object of the invention is to provide meat curing compositions and methods which reduce or eliminate the formation of nitrosamines during subsequent cooking of the cured meat.

Still another object of the invention is to provide a composition and method for curing bacon which reduce or eliminate the formation of nitrosamines in the bacon during subsequent frying or equivalent cooking operations.

Yet another object of the invention is to provide a nitrite cured meat product in which formation of undesirable nitrosamines during cooking is minimized or eliminated even after storage of the cured meat product.

Other objects and advantages of the present invention will become apparent to those skilled in the art upon examination of the detailed description which follows.

DETAILED DESCRIPTION OF THE INVENTION

The present invention is based on the discovery that novel acetals and ketals derived from ascorbic acid and their edible salts are readily incorporated into meat, possess good heat stability, stability against deterioration in said meat on storage, and provide effective antinitrosamine activity when nitrite cured meats containing such compounds are cooked. The new compounds are represented by the formula:

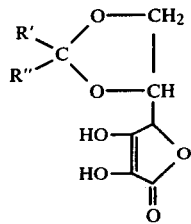

wherein R' is hydrogen or a hydrocarbon group having from 1 to 7 carbon atoms, such as alkyl or alkenyl, and R" is alkyl or alkenyl of 6 to 20 carbon atoms, either straight or branched chain, with the proviso that the total number of carbon atoms in R' and R" is at least 10, or R" is a hydrocarbon chain, for example $-(CH_2)_n-$, where n is an integer of one to fourteen, substituted by a mono or bicyclic hydrocarbon radical wherein the ring or rings are 5 or 6 membered, e.g. phenyl, naphthyl, cyclopentyl and cyclohexyl, and wherein the ring or rings may each contain up to 3 alkyl or alkenyl substituents of from one to seven carbon atoms. Preferably the total number of carbon atoms in R" is no greater than 20. More preferably, R" is alkyl or alkenyl of 12 to 20 carbon atoms and R' is hydrogen or methyl.

The edible salts of the above-identified compounds are also within the scope of the invention. Preferably these salts are dispersible or soluble in aqueous solutions such as curing brines. The most common of these salts is the sodium salt.

The compounds of the invention are formed by conventional reaction procedure. For example, the acetals are formed by reaction of a long chain aldehyde with ascorbic acid. The two reactants are stirred together in an appropriate solvent, such as N,N-dimethylacetamide in the presence of a catalyst, such as toluene-p-sulfonic acid. The acetal product is obtained as a precipitate upon addition of water to the reaction mixture. The precipitate is recovered by any of the conventional methods, for example, extraction with diethyl ether. After washing and drying, the final product having the general structure given above is obtained as a white, crystalline powder which is soluble in fats and oils. The ketals are formed by using a long chain ketone and ascorbic acid as starting materials and by use of reaction conditions known to be appropriate for ketal formation.

The compounds of the invention find utility as agents in nitrite cured meat for reducing or eliminating the formation of nitrosamines in the cured meat during cooking operations. The compounds may be introduced into nitrite cured meat in any convenient manner so as to provide an amount in the cured meat which is effective to reduce or eliminate the nitrosamine content of the meat treated by the compounds and cooked at frying temperatures. In general, the compounds are applied in the brine solution which is used to cure the meat or are applied after cure in solution in a suitable solvent to the surface of the cured meat. Combinations of both methods may also be used.

The optimum amount of the particular compound to be incorporated in the meat varies to some extent from one compound of the general formula to another. In general, the useful range if from about 100 to 1,000 ppm (parts per million) on a weight basis of active compound to cured meat, with a preferred range being from about 500 to 1,000 ppm. Although the quantity of the active compound in the treated meat is extremely low, it nonetheless is effective in materially reducing or eliminating the known nitrosamines of cooked meat products.

Of the various compounds within the ambit of the general structural formula above recited, the acetals and ketals wherein R' is hydrogen or methyl, and R" is alkyl or alkenyl of 12 to 20 carbon atoms are preferred. These preferred compounds provide good inhibition of nitrosamine formation, while allowing the treated meat to enjoy all the advantages of the nitrite cure with respect to color, flavor and protection against bacterial action.

The following examples are provided to further illustrate the various embodiments of the invention and in no way are intended to limit the scope of the invention.

EXAMPLE 1

The Acetal of Dodecanal and Ascorbic Acid

Dodecanal (7.36 g, 0.04 mole) and L-ascorbic acid (17.6 g, 0.1 mole) were stirred together with toluene-p-sulfonic acid (2.0 g, 0.01 mole) in N,N-dimethylacetamide (40 ml) at 60° C. for five hours. The reaction mixture was poured into water and extracted with diethyl ether (3×50 ml). The precipitate which formed on addition to water dissolved in ether. The ether layer was washed with water, dried over anhydrous sodium sulphate and evaporated to dryness on a rotary evaporator. A white solid (12.0 g) was obtained. In two crops from dichloromethane (50 ml) and methanol (3 ml) 9.0 grams of white powder was obtained. The first crop (7.5 g) melted 118-121.5° C. with sintering at 115° C. Crystallization from dichloromethane (300 ml) gave 6.4 g of white crystalline solid. The infrared spectrum in KBr showed two strong acetal bands in the 1000 to 1200 $cm^{-1}$. The PMR spectrum showed no peaks in the δ5-6 ppm region indicating that the compound was in fact the acetal and not the isomeric enol ether.

This compound was found to have a melting point of 122°-124.5° C. with sintering at 120° C. It has the formula $C_{18}H_{30}O_6 \cdot 1/3H_2O$ and molecular weight of 348.4. Its elemental analysis was as follows:

|  | % C | % H | % O |
| --- | --- | --- | --- |
| Calculated : | 62.07 | 8.81 | 29.12 |
| Found : | 62.21 | 8.88 | 29.10 |

The compound is soluble in oil with slight warming.

EXAMPLE 2

Preparation of the Sodium Salt of the Acetal of Dodecanal

The acetal of dodecanal and L-ascorbic acid prepared as in Example 1 (approximately 700 mg) was placed in a beaker with water (3 ml). A solution of sodium hydroxide (300 mg) in water (3 ml) was added dropwise until the solid just dissolved. The pH was 8.1. Water was removed under vacuum. Methanol was added as the evaporation proceeded until a pale yellow powder was obtained. An infrared spectrum of the powder showed that the lactone band at 1740 $cm^{-1}$ and the acetal bands near 1000 to 1200 $cm^{-1}$ were still present.

EXAMPLE 3

The Inhibition of Nitrosamine Formation in Bacon by the Acetal of Dodecanal and L-ascorbic Acid and its Sodium Salt The bacon used in the following experiments was obtained from the production line. The bacon was sampled sequentially as usual to obtain equivalent control and test samples. The acetal was applied to the bacon as a slurry in soybean oil (2.7 ml/lb). The sodium salt was applied as a solution in water. After application of the additive, the bacon was fried without delay and the cook-out fat analyzed for volatile nitrosamines. Table I contains the results of these experiments.

TABLE I

Effect of the Acetal of Dodecanal and L-Ascorbic Acid and its Sodium Salt of Nitrosamines in Bacon

| Sample | Amount of Acetal Additive ppm | Nitrosamines ($\mu$mole $\times 10^{-2}$/Kg) | % Reduction |
|---|---|---|---|
| 1 | 0 | 35 | |
| 2 | 1000 | <3*(2.5) | 91 |
| 3 | 0 | 120 | |
| 4 | 1000 | 18 | 85 |
| 5 | 0 | 67 | |
| 6 | 500 | 3 | 96 |
| 7 | 0 | 47 | |
| 8 | 500 | 4 | 91 |
| 9 | 0 | 58 | |
| 10 | 250 | 13 | 78 |
| 11 | 100 | 25 | 57 |
| | Sodium Salt | | |
| 12 | 0 | 39 | |
| 13 | 500 | 5 | 88 |

*The accurate minimum detection level is 3.0.

The results presented in Table I demonstrate the excellent nitrosamine-reducing properties of the acetal of dodecanal and L-ascorbic acid and its sodium salt. A level of additive in the region of 500 ppm is the preferred minimum for these compounds since decreased effectiveness was observed at 250 and 100 ppm.

The results of a three week time study test on three samples of bacon treated with the acetal of dodecanal and L-ascorbic acid can be seen in Table II. Three lots of six pounds of bacon were obtained at weekly intervals from the plant. The bacon was sequentially sampled into eight packages containing ¾ lb each. The bacon was treated with soybean oil (3 ml per package) or a slurry of the acetal (170 mg in 3 ml oil). One control and one test sample were fried and the cook-out fat analyzed at once. The remaining samples were sealed and stored at 3° C. for 21 days before being fried and analyzed.

TABLE II

Effect of Storage on the Anti-Nitrosamine Activity of the Acetal of Dodecanal

| Sample | Additive ppm | Storage Days | Nitrosamines ($\mu$mole $\times 10^{-2}$/Kg) | % Reduction |
|---|---|---|---|---|
| 1 | 0 | 0 | 52 | |
| 2 | 500 | 0 | <3 (2.3) | 96 |
| 3 | 0 | 21 | 35 | |
| 4 | 500 | 21 | 5 | 86 |
| 5 | 0 | 0 | 58 | |
| 6 | 500 | 0 | 6 | 90 |
| 7 | 0 | 21 | 48 | |
| 8 | 500 | 21 | 12 | 75 |
| 9 | 0 | 0 | 39 | |
| 10 | 500 | 0 | <3 (2.6) | 93 |
| 11 | 0 | 21 | 24 | |
| 12 | 500 | 21 | <3 (2.7) | 89 |

The $C_{12}$ acetal, as illustrated above, is an excellent anti-nitrosamine agent in bacon. However, this acetal does impart a noticeable flavour characteristic to the product. The longer chain acetals, as illustrated below, are preferred for this reason.

EXAMPLE 4

Preparation of the Acetal of Octadecanal with L-ascorbic Acid

Octadecanal (6.0 g, 0.0233 mole ) was stirred with L-ascorbic acid (13.75 g, 0.0781 mole) and toluene-p-sulfonic acid (1.2 g, 0.0066 mole) in N,N-dimethylacetamide (60 ml ) at 60° C. for 20 hours. The reaction mixture was poured into water (100 ml), and extracted with diethyl ether (4×80 ml). The combined ether extract was washed with water (5×80 ml), dried over anhydrous sodium sulphate and evaporated to dryness on a rotary evaporator to give a white solid (8.1 g, 85%), m.p. 106°–115° C. sintering at 103° C. The solid was crystallized from anhydrous diethyl ether-hexane and was purified by several recrystallizations. The product compound had a melting point of 127°–129° C. with sintering at 125° C. It has the formula $C_{24}H_{42}O_6$, $0.2H_2O$ and a molecular weight of 430.1. Its elemental analysis was as follows:

| | % C | % H |
|---|---|---|
| Calculated : | 67.00 | 9.94 |
| Found : | 66.94 | 10.01 |

EXAMPLES 5 AND 6

Acetals of Hexadecanal ($C_{16}$) and Tetradecanal ($C_{14}$) with Ascorbic Acid The acetals of hexadecanal and tetradecanal were prepared in the same manner as in Example 4.

The acetal of hexadecanal ($C_{16}$) and L-ascorbic acid had a melting point of 126°–129.5° C. with sintering at 125° C. It has the formula $C_{22}H_{38}O_6, 0.2H_2O$ and a molecular weight of 402.1. Its elemental analysis was as follows:

| | % C | % H |
|---|---|---|
| Calculated : | 65.65 | 9.63 |
| Found : | 65.58 | 9.84 |

The acetal of tetradecanal ($C_{14}$) and L-ascorbic acid had a melting point of 127°–130.0° C. with sintering at 125° C. It has the formula $C_{20}H_{34}O_6$ and a molecular weight of 370.5. Its elemental analysis is as follows:

| | % C | % H |
|---|---|---|
| Calculated : | 64.84 | 9.25 |
| Found : | 64.55 | 9.54 |

EXAMPLE 7

Inhibition of Nitrosamine Formation in Bacon by $C_{14}$–$C_{18}$ Acetals of L-Ascorbic Acid Production bacon (six pounds) was sequentially sampled into eight ¾ pound packs. These were divided into four samples consisting of one control and three tests. The control packages were treated with soybean oil (2 ml per package). The tests were treated with a slurry of the acetals (340 mg) in 2 ml of soybean oil to give a level of 1000 ppm additive. The bacon was fried after treatment and the cook-out fat analyzed for volatile nitrosamines.

The results of the nitrosamine analyses are given in Table III.

TABLE III

The Anti-Nitrosamine Effect of $C_{14}$, $C_{16}$ and $C_{18}$
Acetals of L-Ascorbic Acid at the 1000 PPM Level in Bacon

| Sample | Additive ppm | Nitrosamines $\mu$mole $\times 10^{-2}$/kg | % Reduction |
|---|---|---|---|
| Control | 0 | 48 | |
| $C_{14}$ acetal | 1000 | <3 (1.6) | 96 |
| $C_{16}$ acetal | 1000 | <3 (1.6) | 96 |
| $C_{18}$ acetal | 1000 | <3 (1.6) | 96 |

The three acetals of this test are excellent anti-nitrosamine agents and when applied at 1000 ppm are equally effective. The rashers were presented to a test panel. All panelists agreed that the $C_{16}$ and $C_{18}$ acetals imparted no flavor to the bacon and that any flavor imparted by the $C_{14}$ acetal was slight.

EXAMPLE 8

Further tests were conducted to determine the relative effectiveness of the acetals at lower levels. The samples were all fried and the cook-out fat analyzed as usual to provide the results reported under Test 1 in Table IV. The experiment was repeated as above but a sample of $C_{16}$ acetal at 500 ppm was included. These results are shown under Test 2 in Table IV.

TABLE IV

The Anti-Nitrosamine Effect of $C_{14}$, $C_{16}$ and $C_{18}$
Acetals of L-Ascorbic Acid in Bacon

| Additive* (ppm) | Nitrosamines $\mu$moles $\times 10^{-2}$/kg | % Reduction |
|---|---|---|
| Test 1 | | |
| Control 0 | 79 | |
| $C_{12}$ acetal 100 | 43 | 46 |
| $C_{14}$ acetal 109 | 26 | 67 |
| $C_{16}$ acetal 118 | 28 | 65 |
| $C_{18}$ acetal 127 | 31 | 61 |
| Test 2 | | |
| Control 0 | 67 | |
| $C_{12}$ acetal 100 | 32 | 52 |
| $C_{14}$ acetal 109 | 25 | 63 |
| $C_{16}$ acetal 118 | 28 | 58 |
| $C_{18}$ acetal 127 | 28 | 58 |
| $C_{16}$ acetal 500 | 5 | 93 |

*The amounts used represent equimolar quantities (0.293 mmoles/kg) of the various acetals corresponding to 100 ppm of the $C_{12}$ acetal.

It appears from this data that the $C_{12}$ acetal is the least active of the group. The $C_{14}$, $C_{16}$ and $C_{18}$ acetals are slightly more effective than the $C_{12}$ acetal at the same molar concentration. As far as anti-nitrosamine activity is concerned the $C_{14}$, $C_{16}$ and $C_{18}$ acetals are equipotent on a molar basis.

EXAMPLE 9

A Twenty-One Day Time Study of the Effectiveness of the $C_{16}$ Acetal in Side Bacon Three test series of samples were prepared (1, 2, 3). The series each consisted of four pounds of bacon. The four pound lots were sequentially sampled to provide four one-pound packages. Two control packages (A and C) were treated with soybean oil (4 ml). The A sample was fried at once and the cook-out fat analyzed for volatile nitrosamines. The C sample was vacuum-sealed and stored at 3° C. for 21 days before being fried and analyzed. The other two packages (B and D) were treated with the $C_{16}$ acetal (454 mg) in soybean oil (4 ml). B was fried and analyzed at once. D was sealed and stored for 21 days at 3° C. with the control sample. The results obtained for the three series are presented in Table V.

TABLE V

Effect of Storage at 3° C. on the
Anti-Nitrosamine Activity of the $C_{16}$ Acetal

| Sample | Days Storage | Nitrosamines $\mu$mole $\times 10^{-2}$/kg | % Reduction |
|---|---|---|---|
| Test 1 | | | |
| 1A Control | 0 | 61 | |
| 1B Test | 0 | <3 (2.5) | 96 |
| 1C Control | 21 | 44 | |
| 1D Test | 21 | <3 (1.9) | 96 |
| Test 2 | | | |
| 2A Control | 0 | 63 | |
| 2B Test | 0 | <3 (2.5) | 96 |
| 2C Control | 21 | 45 | |
| 2D Test | 21 | <3 (2.2) | 95 |
| Test 3 | | | |
| 3A Control | 0 | 78 | |
| 3B Test | 0 | <3 (2.5) | 97 |
| 3C Control | 21 | 59 | |
| 3D Test | 21 | <3 (1.6) | 97 |

The results of these experiments show that the $C_{16}$ acetal does not lose its effectiveness after 21 days at 3° C. when applied at the 1000 ppm level. Levels between 500 and 1000 ppm would appear to be optimum with these compounds.

EXAMPLE 10

The Effect of the Sodium Salt of the $C_{16}$ Acetal of L-Ascorbic Acid in Bacon The $C_{16}$ acetal of L-ascorbic acid (430 mg) was treated with 4 ml of a solution of sodium hydroxide in water (430 mg in 40 ml). The resulting solution was applied to one pound of sequentially sampled bacon from a two pound sample. The second pound was treated with water (4 ml) and served as control. The additive level in this experiment was 1000 ppm of the sodium salt. The bacon was fried after it was treated with the additive and the cook-out fat analyzed as usual.

Two further samples were prepared and treated in the same way. The analytical results of all experiments are given in Table VI.

TABLE VI

The Effect of the Sodium Salt of $C_{16}$ Acetal
of L-Ascorbic Acid in Bacon

| Sample | Nitrosamines $\mu$mole $\times 10^{-2}$/kg | % Reduction |
|---|---|---|
| Control | 35 | |
| Test | <3 (1.6) | 95 |
| Control | 117 | |
| Test | 5 | 96 |
| Control | 93 | |
| Test | 5 | 95 |

The data show that the sodium salt is as effective as the free acetal in reducing nitrosamine formation in bacon.

EXAMPLE 11

Acetal of Oleyl Aldehyde and L-Ascorbic Acid

The acetal of oleyl aldehyde and L-ascorbic acid was prepared in the same manner as set forth in Example 4, using 8.9 g. (0.0334 mole) of oleyl aldehyde, 20.6 g (0.1168 mole) of L-ascorbic acid, 2.09 g (0.011 mole) of toluene-p-sulfonic acid and 100 ml N,N-dimethylacetamide. After several crystallizations, 2.6 g of a product sintering at 88° C. and melting at 90°–91.5° C. was obtained. I.R. showed presence of the acetal bands between 1000 and 1200 cm$^{-1}$. The lactone band was still present at about 1760 cm$^{-1}$.

EXAMPLE 12

Acetal of Hydrocinnamaldehyde (3-Phenylpropionaldehyde) and L-Ascorbic Acid

The following materials were stirred together:
2.0 g Hydrocinnamaldehyde (0.0149 mole)
9.8 g L-Ascorbic acid (0.06 mole)
40 ml Dimethlacetamide
0.8 g Toluene-p-sulfonic acid (0.004 mole)

The reaction mixture was heated for 17 hours in an oil bath at 80° C., cooled and poured into 100 ml water. It was then extracted with ether (5×80 ml) and the ether layer backwashed with water (3×25 ml) and saturated salt solution (1×25 ml). The ether layer was then dried over sodium sulphate and evaporated on a rotary evaporator to give a yellow gum (2.65 g) (60%).

The product was crystallized by dissolving in ether (40 ml), adding hexane (40 ml) and evaporating on a steam bath to 40 ml. White crystals formed at 3° C. overnight, were filtered and dried (yield=0.8 grams). The product sintered at 110° C. and melted at 111.5°-113° C.

NMR and IR confirmed the product as the expected acetal.

EXAMPLE 13

The Anti-Nitrosamine Effect of the Compounds of Examples 11 and 12

The compounds of Examples 11 and 12 were tested for anti-nitrosamine effect in bacon in the same manner as in Example 3. The results were as follows:

TABLE VII

| | Nitrosamines μmole × 10$^{-2}$/kg | % Reduction |
|---|---|---|
| Control | 66 | |
| Oleyl acetal | 1 | 98 |
| 3-Phenylpropan-1-al acetal | 16 | 76 |

EXAMPLE 14

The Acetal of Erythorbic Acid with Hexadecanal

The following materials were stirred together:
17.6 g Erythorbic acid (0.1 mole)
10.0 Hexadecanal (0.04 mole)
2.0 g Toluene-p-sulfonic acid
100 ml Dimethylacetamide
100 ml Benzene After refluxing for 2¼ hours the theoretical amount of water had collected in the Dean-Stark trap. The solution was cooled and diethylamine (1.1 ml) was added. The mixture was evaporated on a rotary evaporator to remove the benzene. The mixture was transferred to a separatory funnel with ether (300 ml) and washed with water (5×50 ml). The water was backwashed with ether (1×50 ml) and the combined ether layer washed with water (1×50 ml). The resulting ether layer was dried over anhydrous sodium sulphate and evaporated on a rotary evaporator to yield a creamy solid (15.5 g; 93%). Crystallization from ether provided a solid product which was pale beige. (Yield 10.6 g. sintering 125° C. and melting at 130°-137° C.)

EXAMPLE 15

The Ketal of 2-Nonadecanone with L-Ascorbic Acid

The following materials were stirred together:
10.0 g 2-Nonadecanone
19.5 g L-Ascorbic acid
100 ml Dimethylacetamide
1.7 g Toluene-p-sulfonic acid
100 ml Benzene The solution was refluxed for 4 hours, collecting the water in a Dean-Stark trap. The theroetical amount of water was collected. The red-brown solution was freed of benzene and dimethylacetamide in vacuum. The residue was taken up in ether (150 ml) and water (100 ml). The water layer was extracted with ether. The combined ether layer was washed with water, dried over sodium sulphate and evaporated to dryness, yielding 13.6 grams of beige solid. IR showed the product to be a mixture of ketal and ketone. The mixture was stirred with hexane (150 ml) for one hour and then filtered off. The residue was dried yielding a beige powder (5.5 g) which turned brown at 99° C., sintered between 110°-112° C. and melted at 118°-125° C. IR still showed traces of ketone. The solid was crystallized from ether, filtered and dried to yield 4.6 grams of beige solid sintering at 130° C. and melting at 135°-138° C. IR showed the product was mainly the desired compound.

EXAMPLE 16

The Anti-Nitrosamine Effect of the Compounds of Examples 14 and 15

The compounds of Examples 13 and 14 were tested in bacon in the same manner as in Example 3; the results were as follows:

TABLE VIII

| Sample | Nitrosamines μmole × 10$^{-2}$/kg | % Reduction |
|---|---|---|
| Control | 84 | |
| C$_{16}$ Acetal of erythorbic acid | 9 | 89 |
| 2-Nonadecanone ketal of L-ascorbic acid | 33 | 61 |

The aldehyde starting materials for preparation of the acetal compounds, where not commercially available, are readily prepared by known methods, e.g. by oxidation of the corresponding alcohols by the method of Corey et al, Tetrahedron Letters, 1975, 31, pp. 2647. Likewise, the ketone starting materials, if not available, may be prepared by known methods from their corresponding alcohols.

A typical embodiment of the invention as applied to commercial operations will now be described. A nitrite containing meat curing solution, also known as a pickle solution, is prepared in the usual manner.

The quantities of the various ingredients in the pickle solution can be varied widely depending on the meat to be cured and the type of cure. Typically, the curing solution may contain on a weight basis, in addition to water, from about 5 to 25% NACl, from 0.05 to 1% sodium nitrite and optionally, up to 2% sodium nitrate, from about 4 to 12% of sugars, e.g., sucrose and dextrose, from 0.1 to 5% ascorbate or isoascorbate. In accordance with the present invention, from about 0.1 to 1.0% of an acetal or ketal derivative of ascorbic acid of the formula given above, or its salt, is also incorporated in this curing solution. From about 0.01 to 0.5% of an edible emulsifying agent may be used if necessary, e.g., where the compound is not sufficiently soluble in the brine.

Any suitable edible emulsifying agent that will facilitate the dispersion of the active compound in water may be used. Representative examples of emulsifying agents are the polyoxyalkylene derivatives of hexitol anhydride partial long chain fatty acid esters, known under the "Tween" trademark. However, the invention is not limited to the use of these representative substances.

The solution is then incorporated into the meat to be cured in any conventional manner, e.g., by soaking or injection. A combination of these procedures can be used. Thus, the meat can be soaked in the pickle solution for a sufficient time to permit diffusion of the solution throughout the meat. Alternatively, the pickle solution can be pumped through the vascular system of the meat cut or injected directly into the muscle by use of a plurality of needles. After pumping or injection, the meat cut may be given a soaking period in the pickle solution. In the case of bacon, the amount of pickle solution incorporated in the meat may be in the order of about 10%, and in the case of hams may be about 18%. However, these amounts are subject to wide variations at the choice of the processor.

In the processing of bacon, hams and the like, after incorporation of the pickle solution, the meat may be subjected to a conventional heating and/or smoking step. Typically, bacon is heated in this step to an internal temperature of about 55° C. and larger cuts such as hams to an internal temperature of about 67° C.

In another embodiment of the invention, a solution or dispersion of one of the novel compounds may be applied to the meat after curing, e.g., a solution of the selected compound in a suitable liquid solvent medium may be sprayed or brushed on slices of the cured meat prior to packaging. Suitable liquids include edible oils, such as soybean oil, as well as vaporizable solvents such as the lower aliphatic alcohols, e.g., ethanol and isopropanol. In general, concentrations of about 1 to 10% of the novel active compound in the liquid medium are used. These compositions are applied to the meat surfaces in amounts to provide from 100 to 1000 ppm of the active compound based on the weight of the cured meat.

The invention can also be applied to the reduction of nitrosamine-forming capacity in other cured meat products, either beef or pork, including corned beef, wieners and bologna.

Meat products treated in accordance with the present invention demonstrate a substantial reduction in nitrosamine formation upon cooking as compared to untreated cured meat products. Moreover, cured meat containing an effective amount of one of the novel compounds of the invention retain the anti-nitrosamine activity over a period of time which allows the treated meat to be stored prior to cooking without a significant loss of anti-nitrosamine activity. This storage stability is a significant improvement over other ascorbyl derivatives presently known to those skilled in the art.

It will be understood that where the term "ascorbic acid" is used in the foregoing description and following claims, it is intended to apply to L-ascorbic acid, D-ascorbic acid (erythoric acid) and mixtures thereof.

What is claimed is:

1. Novel derivatives of ascorbic acid of the formula:

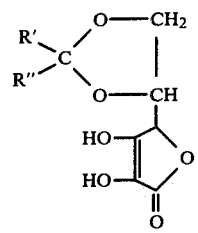

wherein R' is hydrogen or a hydrocarbon group having from 1 to 7 carbon atoms and
R" is alkyl or alkenyl of 6 to 20 carbon atoms, either straight or branched chain, with the proviso that the total number of carbon atoms in R' and R" is at least 10, or R" is a hydrocarbon chain of one to fourteen carbon atoms substituted by a mono or bicyclic hydrocarbon radical wherein the ring or rings are 5 or 6 membered and wherein the ring or rings may each contain up to 3 alkyl or alkenyl substituents of from one to seven carbon atoms, and the edible salts thereof.

2. The compounds as defined by claim 1, wherein R' is hydrogen or methyl and R" is selected from the group consisting of alkyl and alkenyl having 12 to 20 carbon atoms.

3. The compounds as defined by claim 1, wherein R' is hydrogen and R" is alkyl of 12 to 20 carbon atoms.

4. The compounds as defined by claim 1, wherein R' is hydrogen and R" is alkenyl of 12 to 20 carbon atoms.

5. The dodecanal acetal of ascorbic acid.

6. The sodium salt of the compound defined in claim 5.

7. The tetradecanal acetal of ascorbic acid.

8. The hexadecanal acetal of ascorbic acid.

9. The sodium salt of the compound defined in claim 8.

10. The octadecanal acetal of ascorbic acid.

11. The oleyl aldehyde acetal of ascorbic acid.

12. The 3-phenylpropan-1-al acetal of ascorbic acid.

13. The 2-nonadecanone ketal of ascorbic acid.

14. An L-ascorbic acid derivative as claimed in claim 1.

15. An erythorbic acid derivative as claimed in claim 1.

16. The hexadecanal acetal of erythorbic acid.

* * * * *